(12) United States Patent
Kiriyama

(10) Patent No.: US 11,985,015 B2
(45) Date of Patent: May 14, 2024

(54) TRANSMISSION DEVICE AND METHOD AS WELL AS RECEPTION DEVICE AND METHOD

(71) Applicant: SONY GROUP CORPORATION, Tokyo (JP)

(72) Inventor: Sawako Kiriyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 185 days.

(21) Appl. No.: 17/309,916

(22) PCT Filed: Dec. 27, 2019

(86) PCT No.: PCT/JP2019/051400
§ 371 (c)(1),
(2) Date: Mar. 3, 2022

(87) PCT Pub. No.: WO2020/145193
PCT Pub. Date: Jul. 16, 2020

(65) Prior Publication Data
US 2022/0224576 A1 Jul. 14, 2022

(30) Foreign Application Priority Data
Jan. 11, 2019 (JP) ................................. 2019-003159

(51) Int. Cl.
*H04B 1/69* (2011.01)
*H04B 1/707* (2011.01)
(Continued)

(52) U.S. Cl.
CPC .......... *H04L 27/103* (2013.01); *H04L 27/156* (2013.01)

(58) Field of Classification Search
CPC ........ H04L 27/103; H04L 27/156; H04B 1/69
(Continued)

(56) References Cited

U.S. PATENT DOCUMENTS

2003/0022651 A1   1/2003 Bannasch et al.
2009/0180518 A1*  7/2009 Ishii ..................... H04B 1/7172
                                                           375/E1.001
(Continued)

FOREIGN PATENT DOCUMENTS

CA   2395171 A1   6/2001
DE   19961777 A1  7/2001
(Continued)

OTHER PUBLICATIONS

International Search Report and Written Opinion of PCT Application No. PCT/JP2019/051400, dated Feb. 10, 2020, 09 pages of ISRWO.

(Continued)

*Primary Examiner* — Tanmay K Shah
(74) *Attorney, Agent, or Firm* — CHIP LAW GROUP

(57) ABSTRACT

The present technology relates to a transmission device and method as well as a reception device and method which can suppress the influence of interference. The transmission device sets different methods of changing the frequency of the chirp modulation for each of first information and second information different from the first information. The transmission device transmits the chirp-modulated first information or second information in accordance with the set frequency change method. The present technology can be applied to a wireless communication system.

20 Claims, 17 Drawing Sheets

(51) Int. Cl.
*H04L 27/10* (2006.01)
*H04L 27/144* (2006.01)
*H04L 27/156* (2006.01)

(58) Field of Classification Search
USPC .......................................................... 375/139
See application file for complete search history.

(56) References Cited

U.S. PATENT DOCUMENTS

| | | | |
|---|---|---|---|
| 2016/0020932 A1* | 1/2016 | Sornin | H04B 1/69 375/139 |
| 2016/0094268 A1* | 3/2016 | Seller | H04B 1/69 375/139 |
| 2016/0094269 A1* | 3/2016 | Seller | H04B 1/692 375/139 |
| 2020/0200904 A1* | 6/2020 | Singer | G01S 17/931 |
| 2020/0241139 A1* | 7/2020 | Roos | G01S 17/931 |

FOREIGN PATENT DOCUMENTS

| | | |
|---|---|---|
| JP | 4777571 B2 | 9/2011 |
| WO | 2001/047203 A2 | 6/2001 |

OTHER PUBLICATIONS

Makino, et al., "Co-channel Interference among FMCW Radars Using Various Chirp Rates", IEICE Technical Report, vol. 117, No. 403, Jan. 18, 2018, pp. 56-64.

Khan, et al., "Performance of quadratic and exponential multiuser chirp spread spectrum communication systems", International Symposium on Performance Evaluation of Computer and Telecommunication Systems (SPECTS), Jul. 7-10, 2013, pp. 58-63.

* cited by examiner

TRANSMISSION DEVICE AND METHOD AS WELL AS RECEPTION DEVICE AND METHOD

CROSS REFERENCE TO RELATED APPLICATIONS

This application is a U.S. National Phase of International Patent Application No. PCT/JP2019/051400 filed on Dec. 27, 2019, which claims priority benefit of Japanese Patent Application No. JP 2019-003159 filed in the Japan Patent Office on Jan. 11, 2019. Each of the above-referenced applications is hereby incorporated herein by reference in its entirety.

TECHNICAL FIELD

The present technology relates to transmission devices and methods as well as to reception devices and methods, and particularly to transmission devices and methods as well as reception devices and methods, which can suppress the influence of interference.

BACKGROUND ART

It is possible to create new services by giving a sensor terminal to a person or thing to utilize a wireless communication system for Internet of Things (IoT) that periodically transmits information acquired from the sensor terminal by wireless communication. For example, by putting a sensor terminal with GPS onto an elderly person or a child and periodically transmitting positional information, which is sensor data, a monitoring service can be realized.

As such services increase, it is expected that the number of sensor terminals in the wireless communication system will become enormous.

In a case where the number of sensor terminals becomes enormous and interference occurs between sensor terminals, the signal-to-noise ratio (SN ratio) at the base station decreases, and the reception performance deteriorates. Therefore, as the wireless communication method of the wireless communication system for IoT, it is desirable to use a wireless communication method in which interference between sensor terminals is unlikely to occur.

Moreover, since various wireless communications are scattered in a license-free frequency band, it is desirable to use a wireless communication method that is resistant to interference between wireless communication systems as the wireless communication method of the wireless communication system for IoT.

One example of a wireless communication method that is resistant to interference between wireless communication systems is a wireless communication system that uses chirp modulation. The chirp modulation is one of the modulation methods for frequency diffusion, and is a modulation method in which the frequency of a primary-modulated carrier wave is changed by a continuous frequency in accordance with time (see Patent Document 1).

CITATION LIST

Patent Document

Patent Document 1: International Publication No. 2017/212810

SUMMARY OF THE INVENTION

Problems to be Solved by the Invention

However, in a wireless communication system using chirp modulation, as the number of transmitted signals increases, the time or frequency interval used between the signals becomes narrower, and the entire frame included in the signal is affected by interference. As a result, the receiving side may not be able to demodulate the frame correctly.

The present technology has been made in light of such a situation and can suppress the influence of interference.

Solutions to Problems

A transmission device according to one aspect of the present technology includes: a control unit that sets a different frequency change of chirp modulation for each of first information and second information different from the first information; and a transmission unit that transmits the first information or the second information that has undergone the chirp modulation in accordance with the set frequency change.

In one aspect of the present technology, a different frequency change of chirp modulation is set for each of the first information and the second information different from the first information. Then, the first information or the second information obtained by performing the chirp modulation is transmitted in accordance with the set frequency change.

A reception device according to another aspect of the present technology includes: a reception unit that receives first information or second information that has undergone chirp modulation in accordance with a different frequency change of the chirp modulation set for each of the first information and the second information different from the first information; and a demodulation unit that demodulates the received first information or second information in accordance with the frequency change set for each of the first information and the second information.

According to another aspect of the present technology, the first information or the second information, which has undergone chirp modulation in accordance with a different frequency change of chirp modulation set for each of the first information and the second information different from the first information, is received. Then, the received first information or second information is demodulated in accordance with the frequency change set for each of the first information and the second information.

MODE FOR CARRYING OUT THE INVENTION

Hereinafter, modes for carrying out the present technology will be described. The description will be given in the following order.
1. First embodiment (example of setting the increase/decrease direction of a frequency change depending on the frame type)
2. Second embodiment (example of setting increase/decrease direction of a frequency change depending on frame transmission direction)
3. Third embodiment (example of setting a rate of a frequency change depending on the frame type)
4. Fourth embodiment (computer)

First Embodiment

<Configuration Example of Wireless Communication System>

Figure 1:
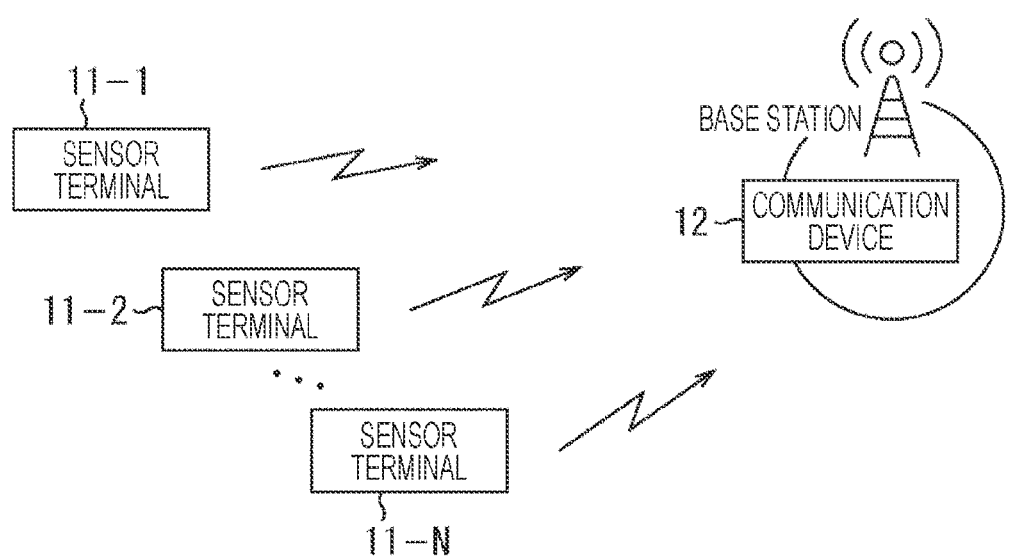
FIG. 1 is a block diagram showing a configuration example of a wireless communication system according to a first embodiment of the present technology.

FIG. 1 is a diagram showing a configuration example of a wireless communication system according to a first embodiment of the present technology.

A wireless communication system 1 in FIG. 1 is a wireless communication system for Internet of Things (IoT). The wireless communication system 1 is configured by connecting sensor terminals 11-1 to 11-N and a communication device 12 of a base station with wireless communication. Note that, in the wireless communication system 1, chirp modulation is used as a modulation method for the transmission signal.

Chirp modulation is one of the modulation methods for frequency diffusion, and is a modulation method in which the frequency of a primary-modulated carrier wave is changed by a continuous frequency in accordance with time. Note that, hereinafter, a signal obtained by chirp modulation is referred to as a chirp signal.

The sensor terminals 11-1 to 11-N are IoT devices equipped with one or a plurality of sensors. The sensor terminals 11-1 to 11-N include at least one sensor among, for example, a camera, a microphone, an acceleration sensor, an angular velocity sensor, a geomagnetic sensor, an illuminance sensor, a temperature sensor, a humidity sensor, a moisture sensor, an optical sensor, a pressure sensor, and a positioning sensor and the like.

Hereinafter, in a case where it is not necessary to distinguish the sensor terminals 11-1 to 11-N, they are collectively referred to as the sensor terminal 11 as appropriate.

The sensor terminal 11 measures, for example, a measurement target and generates a data frame including sensor data representing the measurement result. The sensor terminal 11 performs chirp modulation on the signal of the data frame and transmits the chirp signal of the data frame obtained by the chirp modulation to the communication device 12.

Moreover, the sensor terminal 11 generates a control frame prior to the transmission of the chirp signal of the data frame and transmits a chirp signal of a control frame, which is obtained by performing the chirp modulation on the signal of the control frame, to the communication device 12.

The control frame includes a terminal ID required to participate in the wireless communication system 1 and transmission-related information used to decide the wireless resources available for the transmission of the data frame.

The wireless resources include frequency (band) and time. The transmission-related information includes information such as an internal time and a terminal ID of the sensor terminal 11.

The sensor terminal 11 decides the wireless resource of the data frame on the basis of the internal time, the terminal ID, and the like of the sensor terminal 11 and transmits the data frame to the communication device 12 by using the wireless resources of the decided data frame.

The base station is provided with the communication device 12. The communication device 12 receives the chirp signal of the control frame transmitted from the sensor terminal 11. The communication device 12 decides the wireless resource of the data frame by using the transmission-related information obtained by receiving the chirp signal of the control frame. The communication device 12 receives the chirp signal of the data frame transmitted from the sensor terminal 11 by using the wireless resources of the decided data frame.

As described above, the control frame can be said to be a frame that plays an important role because the control frame is a frame used for transmitting transmission-related information used by both the sensor terminal 11 and the communication device 12 to decide the wireless resource of the data frame. Therefore, the control frame needs to have higher reception performance than the data frame. Furthermore, the control frame and data frame are generally transmitted by using different wireless resources.

In a case of transmission at different frequencies, it is necessary to assign a different frequency to each of the transmission of the control frame and the transmission of the data frame in advance. However, in the case of a wireless communication system that uses a license-free frequency (band), it is difficult to predict which frequency has a lot of interference, and it is not realistic to allocate frequencies in advance.

Furthermore, in case of transmitting at different times, it is necessary to synchronize the time between the base station and the terminal and allocate different times to the transmission of the control frame and the transmission of the data frame within a predetermined cycle.

There are two main approaches to time synchronization. The first is a method in which the base station periodically transmits a beacon for time synchronization, the terminal receives the beacon transmitted by the base station, and the terminal side synchronizes the time using the received beacon information.

The second is a method in which both the terminal and the base station hold GPS receivers, and the time is synchronized by receiving a GPS signal including time information.

The first method requires DL (DOWN_Link) communication, which is communication from the base station to the terminal. Moreover, the communication distance of the required DL communication and the communication distance of UL (UP_Link) communication, which is communication from the terminal to the base station, must be the same distance.

In the second method, each of the base station and the terminal is required to be able to receive GPS signals, and the terminal needs to be installed outdoors.

In a wireless communication system for IoT, a wireless communication system that does not have a DL communication function is assumed due to low power consumption and low cost of terminals. Further, a wireless communication system is assumed in which the reception sensitivity on the base station side is improved by synthesizing the reception signal in the base station having no power consumption restriction and the communication distance between UL communication and DL communication is asymmetric. Furthermore, it is assumed that the terminal will be installed indoors or underground, making it difficult to receive GPS signals.

From the above, in the wireless communication system for IoT, time synchronization is difficult. Thus, it is necessary to allow the control frame and the data frame to be transmitted using the same wireless resource.

Moreover, in the wireless communication system for IoT, it is assumed that the number of terminals will be enormous. In a case where interference occurs between terminals, the SN ratio in the base station will decrease and the reception performance will decrease. Therefore, for the wireless communication system for IoT, it is desirable to use a wireless communication method in which interference between terminals in the wireless communication system is unlikely to occur.

Moreover, since various wireless communications are scattered in a license-free frequency band, it is desirable to use a wireless communication method that is resistant to interference between wireless communication systems for the wireless communication system for IoT.

One example of a wireless communication method that is resistant to interference between wireless communication systems is a wireless communication method that uses the above-mentioned chirp modulation.

<Example of Transmitting Chirp Signal>

Figure 2:
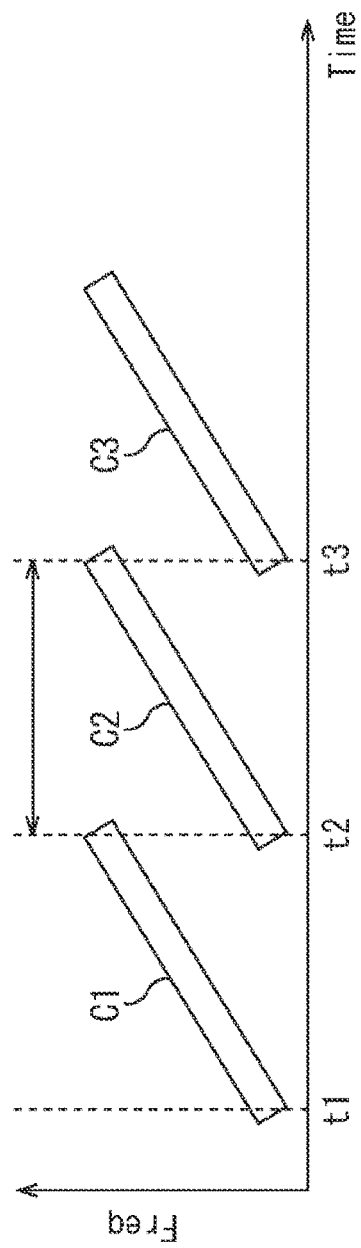
FIG. 2 is a diagram showing an example of transmitting a chirp signal in a case where there are sufficient intervals.

FIG. 2 is a diagram showing an example of transmitting chirp signals in a case where there are sufficient intervals.

In FIG. 2, the vertical axis represents frequency (Freq), and the horizontal axis represents time (Time). Three diagonally arranged strips each represent a chirp signal of one frame. The same applies to the following drawings.

In the example in FIG. 2, the transmission start times of chirp signals C1 to C3 are times t1 to t3, respectively. The chirp signals C1 to C3 continuously change in frequency at the same rate in accordance with time. The slopes of the chirp signals correspond to the rates.

As indicated by the double-headed arrow, in a case where the chirp signals are sufficiently spaced from each other, that is, in a case where the transmission start times t1 to t3 of the chirp signals C1 to C3 are sufficiently spaced from each other in time, no interference occurs between the chirp signals C1 to C3. Therefore, it can be said that the chirp signal is excellent in multi-access.

Figure 3:
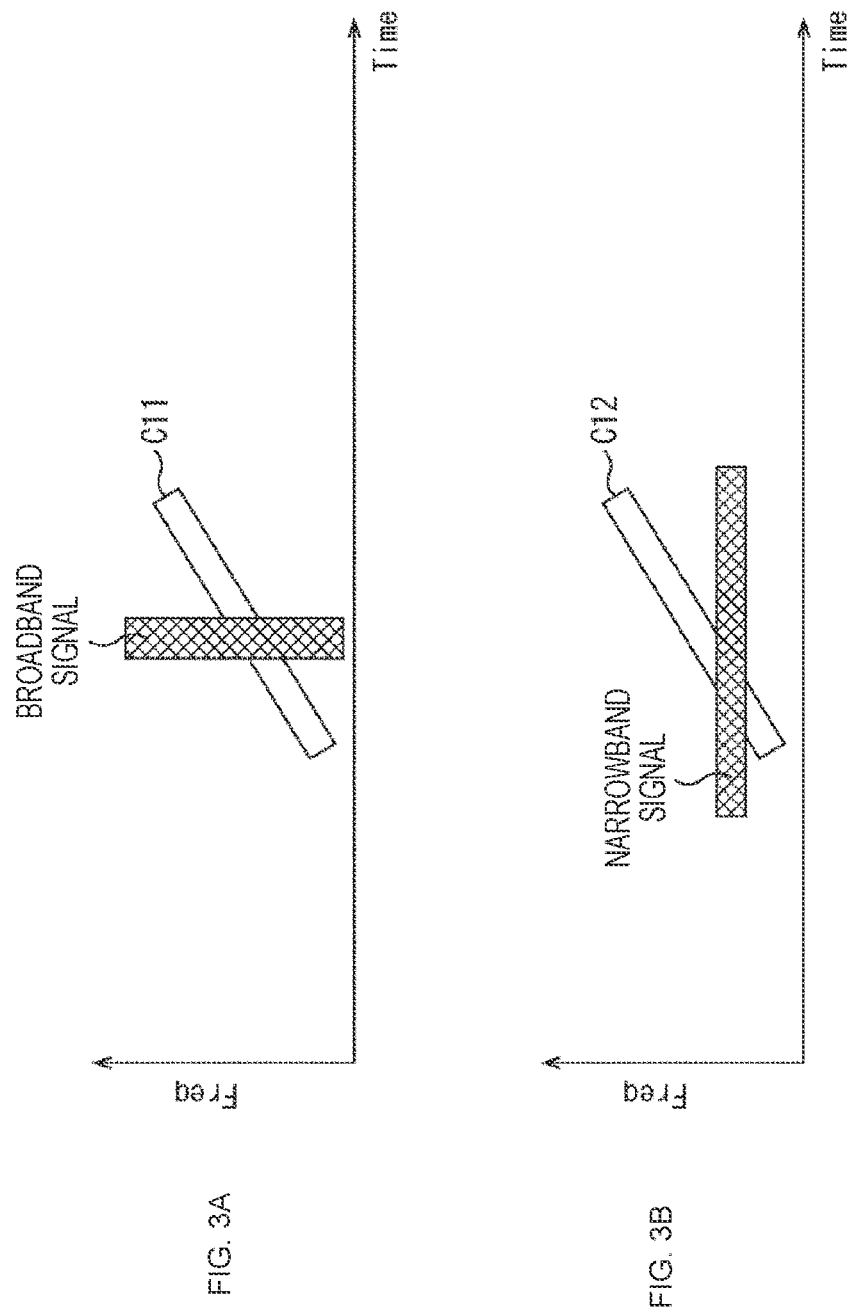
FIGS. 3A and 3B are diagrams showing an example of interference of chirp signals.

FIGS. 3A and 3B are diagrams showing an example of interference of chirp signals.

In FIG. 3A, an example in which a wideband signal is transmitted during transmission of a chirp signal C11 is shown. In this case, interference due to the wideband signal occurs in the chirp signal C11.

Note that, since the frequency of the chirp signal C11 changes continuously in accordance with time, interference due to the wideband signal occurs only in the signal portion at the time when the chirp signal C11 and the wideband signal intersect.

In FIG. 3B, an example in which the chirp signal C12 is transmitted during the transmission of the narrowband signal is shown.

Note that, since the frequency of the chirp signal C12 changes continuously in accordance with time, interference due to the narrowband signal occurs only in the signal portion at the time when the chirp signal C12 and the narrowband signal intersect.

As described above, the interference caused by the wideband signal or narrowband signal affects only a part of the frame included in the signal, and error correction is possible by using redundant coding or interleaving. Therefore, the frame can be demodulated correctly on the reception side.

As described above, it can be said that the chirp signal is a signal having strong interference resistance.

Figure 4:
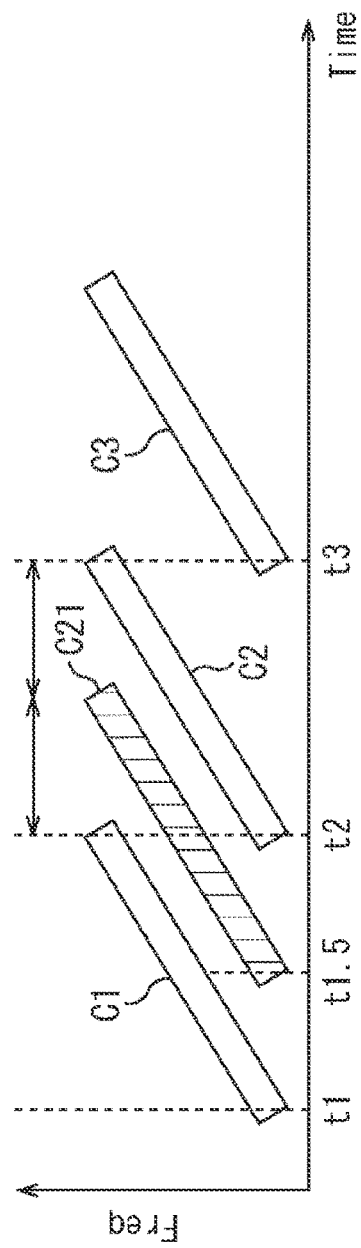
FIG. 4 is a diagram showing an example of transmitting chirp signals in a case where the intervals are narrow.

FIG. 4 is a diagram showing an example of transmitting chirp signals in a case where the intervals are narrow.

Chirp signals C1 to C3 in FIG. 4 are, for example, chirp signals of a data frame transmitted from the sensor terminal 11-1.

As described above with FIG. 2, the transmission start times of the chirp signals C1 to C3 are the times t1 to t3, respectively.

Herein, as shown by diagonal lines, a chirp signal C21, which is a chirp signal of the control frame, is transmitted from the other sensor terminal 11-2 at time t1.5 (time t1<time t1.5<time t2). The chirp signal of the control frame also changes in frequency at the same rate as the chirp signals C1 to C3 of the data frame.

In this case, there is not a sufficient space between the chirp signal C1 of the data frame and the chirp signal C21 of the control frame and between the chirp signal C21 of the control frame and the chirp signal C2 of the data frame. As shown in FIG. 4, the interval between the chirp signal C21 of the control frame and the chirp signal C1 of the data frame is narrower than the interval between the chirp signal C1 and the chirp signal C2 in FIG. 2. In a case where the interval between the chirp signals is narrow, the chirp signals will interfere with each other.

As indicated by the double-headed arrow, in a case where the chirp signals are not sufficiently spaced from each other, that is, in a case where the time intervals between the time t1, the time t1.5, and the time t2, which are the transmission start times of the chirp signal C1, the chirp signal C21, and the chirp signal C2 are narrow, interference occurs at the chirp signal C1, the chirp signal C21, and the chirp signal C2.

As described above, as the number of transmitted chirp signals increases, the interval between the chirp signals becomes narrower, and the entire frame of the chirp signal may be affected by interference. In that case, the frame cannot be demodulated correctly on the receiving side.

Therefore, in the present technology, the method of changing the frequency of the chirp modulation is set for each type of frame to be transmitted and the transmission direction of the frame. For example, by performing chirp modulation that changes the frequency differently for each type of frame, it is possible to suppress the influence of interference between signals.

<Configuration Example of Sensor Terminal>

Figure 5:
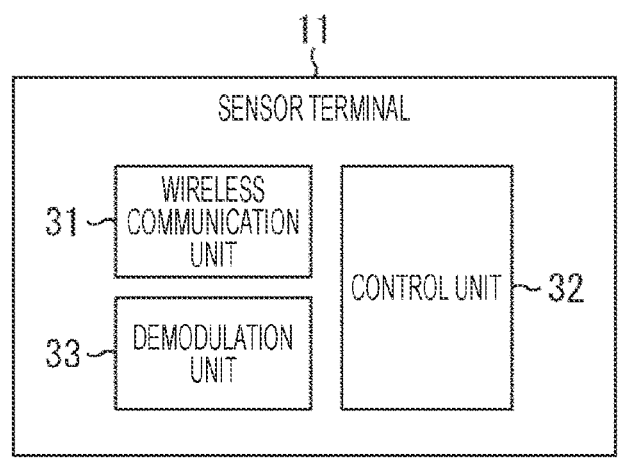
FIG. 5 is a block diagram showing a configuration example of the sensor terminal 11.

FIG. 5 is a block diagram showing a configuration example of the sensor terminal 11.

The sensor terminal 11 is constituted by a wireless communication unit 31, a control unit 32, and a demodulation unit 33.

The wireless communication unit 31 converts the chirp signal of the control frame and the chirp signal of the data frame supplied from the control unit 32 into a wireless signal and transmits the wireless signal to the communication device 12 according to the control from the control unit 32.

Furthermore, the wireless communication unit 31 receives the wireless signal transmitted from the communication device 12 and converts the wireless signal into a chirp signal. The wireless communication unit 31 outputs the converted chirp signal to the demodulation unit 33.

The control unit 32 decides the wireless resources of the control frame. The wireless resources include transmission time and transmission frequency. The wireless resources of the control frame are decided on the basis of an arbitrary value or a value common to the wireless communication system 1. The control unit 32 generates a control frame including the internal time and the terminal ID of the sensor terminal 11, performs redundant coding and interleaving for error correction on the generated control frame, and then performs primary modulation.

The control unit 32 decides the transmission time and transmission frequency, which are the wireless resources of the data frame, by performing the calculation defined by the wireless communication system 1 on the basis of the internal time and the terminal ID of the sensor terminal 11. The control unit 32 generates a data frame including the sensor data, performs redundant coding and interleaving for error correction on the generated data frame, and then performs primary modulation.

In the control unit 32, chirp modulation is performed as secondary modulation. There are two types of increase/decrease direction of the frequency change of chirp modulation: a down chirp that decreases the frequency with time and an up chirp that increases the frequency with time.

In a case where the frame to be transmitted is a control frame, the control unit 32 sets the increase/decrease direction of the frequency change of the chirp modulation to the down chirp. Moreover, in a case where the frame to be transmitted is a data frame, the control unit 32 sets the increase/decrease direction of the frequency change of the chirp modulation to the up chirp.

The control unit 32 performs chirp modulation of down chirp as the secondary modulation on the control frame after the primary modulation and generates a chirp signal of the control frame. Furthermore, the control unit 32 performs chirp modulation of up chirp as the secondary modulation on the data frame after the primary modulation and generates a chirp signal of the data frame.

The control unit 32 controls the wireless communication unit 31 to cause the chirp signal of the generated control frame to be transmitted by using the transmission time and the transmission frequency of the wireless resources of the decided control frame. Further, the control unit 32 controls the wireless communication unit 31 to cause the chirp signal of the generated data frame to be transmitted by using the transmission time and the transmission frequency which are the wireless resources of the decided data frame.

In this way, in the control unit 32, in a case where the frame to be transmitted is a control frame, the frequency change method in which the increase/decrease direction of the frequency change is a down chirp is set. In a case where the frame to be transmitted is a data frame, the frequency change method in which the increase/decrease direction of the frequency change is an up chirp is set.

Furthermore, the control unit 32 has a function of receiving frames transmitted from the base station.

The control unit 32 detects a control frame from the demodulation signal supplied from the demodulation unit 33. The control unit 32 performs primary demodulation on the detected control frame, performs deinterleaving and redundant decoding for error correction, then decodes the control frame, and acquires the internal time and the terminal ID of the communication device 12 included in the control frame.

The control unit 32 decides the transmission time and transmission frequency, which are the wireless resources of the data frame, by performing the calculation defined by the wireless communication system 1 using the internal time and the terminal ID of the communication device 12. The control unit 32 controls the wireless communication unit 31 to cause the chirp signal of the data frame to be received by using the transmission time and transmission frequency of the wireless resources of the decided data frame.

The control unit 32 detects a data frame from the demodulation signal supplied from the demodulation unit 33. The control unit 32 performs primary demodulation on the detected data frame, performs deinterleaving and redundant decoding, then decodes the data frame, and obtains the sensor data of the communication device 12 included in the data frame.

The demodulation unit 33 dechirps (secondarily demodulates) the chirp signal supplied from the wireless communication unit 31 with an up chirp, obtains a demodulation signal, and supplies the obtained demodulation signal to the control unit 32. Furthermore, the demodulation unit 33 dechirps (secondarily demodulates) the chirp signal supplied from the wireless communication unit 31 with a down chirp, obtains a demodulation signal, and supplies the obtained demodulation signal to the control unit 32.

Note that the sensor terminal 11 (wireless communication unit 31 and control unit 32) does not necessarily have a reception function. In a case where the sensor terminal 11 does not have a reception function, the demodulation unit 33 is excluded.

<Operation Example of Sensor Terminal>

Figure 6:
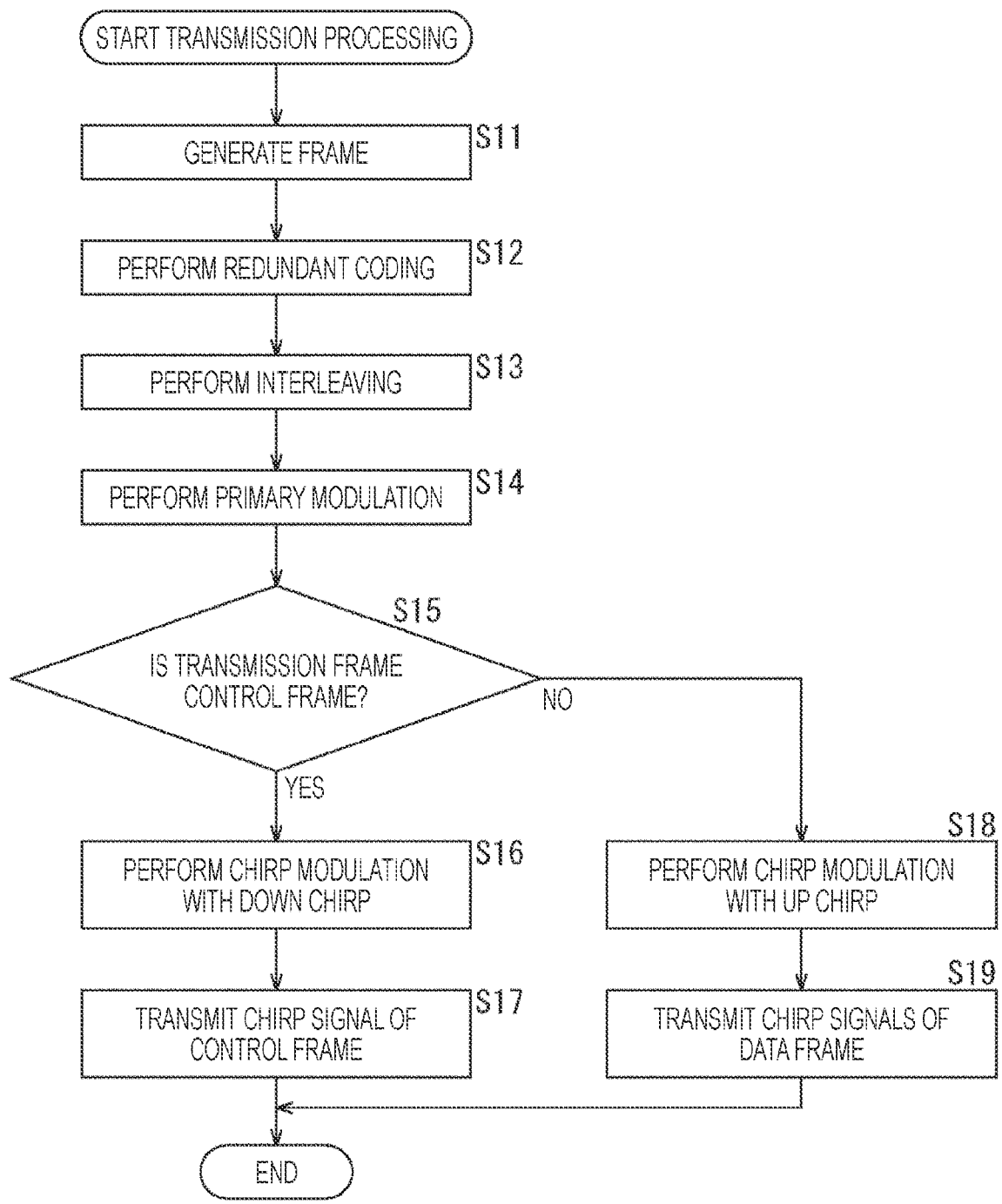
FIG. 6 is a flowchart illustrating transmission processing of the sensor terminal 11.

FIG. 6 is a flowchart illustrating transmission processing of the sensor terminal 11.

In step S11, the control unit 32 generates a frame. A control frame including the internal time and terminal ID of the sensor terminal 11 or a data frame including sensor data is generated.

In step S12, the control unit 32 performs redundant coding on the generated frame to obtain a frame after the redundant coding.

In step S13, the control unit 32 interleaves the frame after the redundant coding to obtain the frame after the interleaving.

In step S14, the control unit 32 performs primary modulation on the frame after the interleaving to obtain the frame after the primary modulation.

In step S15, the control unit 32 determines whether or not the frame to be transmitted is a control frame. In a case where it is determined in step S15 that the frame to be transmitted is a control frame, the processing proceeds to step S16.

In step S16, the control unit 32 obtains a chirp signal of the control frame by chirp-modulating the control frame with a down chirp.

In step S17, the control unit 32 controls the wireless communication unit 31 to cause the chirp signal of the control frame to be transmitted by using the transmission time and transmission frequency of the control frame.

On the other hand, in a case where it is determined in step S15 that the frame to be transmitted is a data frame, the processing proceeds to step S18.

In step S18, the control unit 32 obtains the chirp signal of the data frame by chirp-modulating the data frame with an up chirp.

In step S19, the control unit 32 controls the wireless communication unit 31 to cause the chirp signal of the data frame to be transmitted by using the transmission time and transmission frequency of the data frame.

The transmission processing ends after the chirp signal of the control frame is transmitted in step S17 or after the chirp signal of the data frame is transmitted in step S19.

<Configuration Example of Communication Device>

Figure 7:
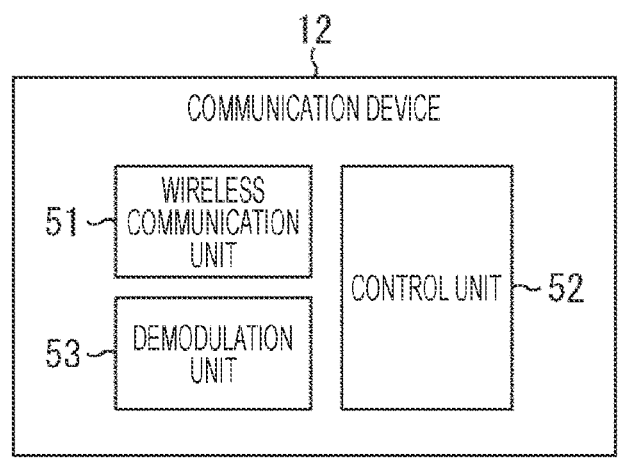
FIG. 7 is a block diagram showing a configuration example of the communication device 12.

FIG. 7 is a block diagram showing a configuration example of the communication device 12.

The communication device 12 is constituted by a wireless communication unit 51, a control unit 52, and a demodulation unit 53.

The configurations of the wireless communication unit 51 to the demodulation unit 53 are basically similar to those of the wireless communication unit 31 to the demodulation unit 33 in FIG. 5. The detailed description will be omitted as it will be redundant.

<Operation Example of Reception Device>

Figure 8:
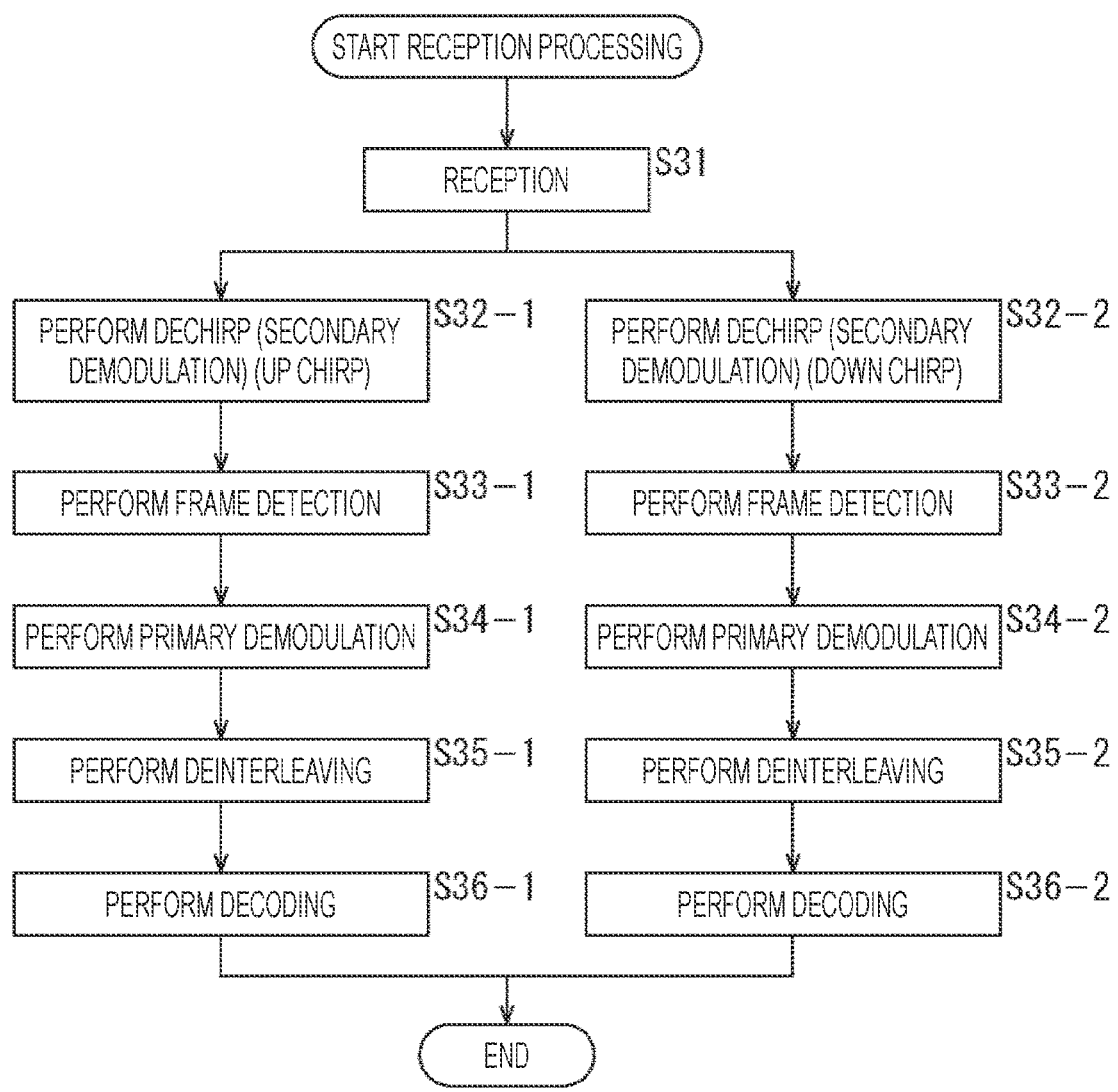
FIG. 8 is a flowchart illustrating reception processing of the communication device 12.

FIG. 8 is a flowchart illustrating reception processing of the communication device 12.

In step S31, the wireless communication unit 51 receives a wireless signal transmitted from the sensor terminal 11 and converts the wireless signal into a chirp signal. The wireless communication unit 51 outputs the converted chirp signal to the demodulation unit 53.

In the control unit 52 and the demodulation unit 53, for example, processing in a case where the chirp signal transmitted from the sensor terminal 11 is the chirp signal of the digital frame (steps S32-1 to S36-1) and processing in a case where the chirp signal transmitted from the sensor terminal 11 is the chirp signal of the control frame (steps 32-2 to S36-2) are performed in parallel.

In step S32-1, the demodulation unit 53 dechirps (secondarily demodulates) the chirp signal supplied from the wireless communication unit 51 with an up chirp, obtains a demodulation signal, and supplies the obtained demodulation signal to the control unit 32.

In step S33-1, the control unit 52 detects the control frame from the demodulation signal supplied from the demodulation unit 53.

In step S34-1, the control unit 52 primarily demodulates the detected control frame and obtains the control frame after the primary demodulation.

In step S35-1, the control unit 52 performs deinterleaving and redundant decoding on the control frame after the primary demodulation and obtains the control frame after the redundant decoding.

In step S36-1, the control unit 52 decodes the control frame after the redundant decoding and acquires the internal time and the terminal ID of the sensor terminal 11 included in the control frame obtained by the decoding.

On the other hand, in step S32-2, the demodulation unit 53 dechirps (secondarily demodulates) the chirp signal supplied from the wireless communication unit 51 with a down chirp, obtains the demodulation signal, and supplies the obtained demodulation signal to the control unit 32.

In step S33-2, the control unit 52 detects the data frame from the demodulation signal supplied from the demodulation unit 53.

In step S34-2, the control unit 52 primarily demodulates the detected data frame and obtains the data frame after the primary demodulation.

In step S35-2, the control unit 52 performs deinterleaving and redundant decoding on the data frame after the primary demodulation and obtains the data frame after the redundant decoding.

In step S36-2, the control unit 52 decodes the data frame after the redundant decoding and obtains the sensor data included in the data frame obtained by the decoding. Thereafter, the reception processing ends.

<Example of Effects According to First Embodiment>

Figure 9:
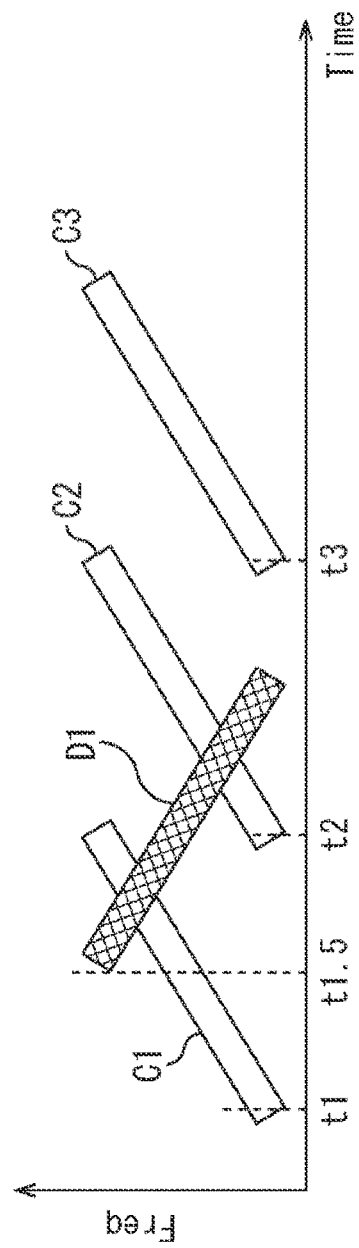
FIG. 9 is a diagram showing an example of transmitting chirp signals according to the first embodiment of the present technology.

FIG. 9 is a diagram showing an example of transmitting a chirp signal according to the first embodiment of the present technology.

Chirp signals C1 to C3 in FIG. 9 are signals that change in frequency at the same rate with an up chirp. The chirp signals C1 to C3 are chirp signals of the data frame transmitted from the sensor terminal 11-1.

As described above with FIG. 2, the transmission start times of the chirp signals C1 to C3 are the times t1 to t3, respectively.

On the other hand, a chirp signal D1 is a signal that changes in frequency at the same rate as the chirp signals C1 to C3 of the data frame with a down chirp. The chirp signal D1 is a chirp signal of the control frame transmitted from another sensor terminal 11-2. Note that the transmission start time of the chirp signal D1 of the control frame is time t1.5.

The interference between the chirp signals C1 to C3 of the data frame and the chirp signal D1 of the control frame occurs at only a frame portion included in a time signal at which the chirp signals C1 and C2 of the data frame and the chirp signal D1 of the control frame intersect.

Since only a part of the frame is affected by interference, error correction is possible by combining with redundant coding, interleaving, and the like. Thus, it is possible to correctly demodulate both the chirp signal of the data frame and the chirp signal of the control frame on the reception side.

Note that, in the above, the frequency change of the chirp modulation of the control frame is a down chirp, and the frequency change of the chirp modulation of the data frame is an up chirp, but the increase/decrease directions may be opposite directions.

As described above, in the first embodiment, different directions are set as the increase/decrease directions of the frequency changes of the chirp modulation of the control frame and the chirp modulation of the data frame. Therefore, even in a case where the control frame and the data frame are transmitted using the same wireless resource, interference can be suppressed, and deterioration of reception performance can be prevented.

Second Embodiment

<Configuration Example of Wireless Communication System>

Figure 10:
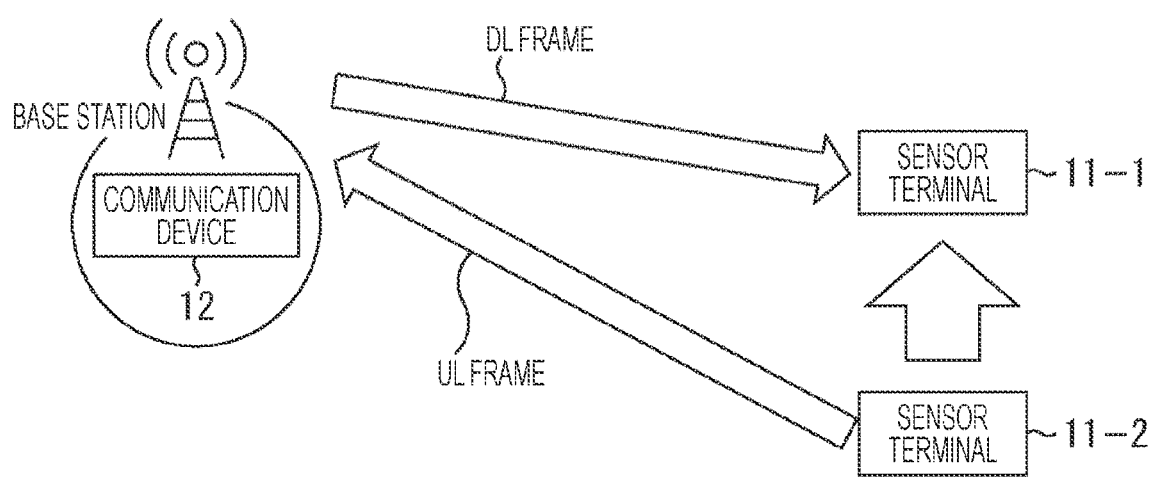
FIG. 10 is a diagram showing a configuration example of a wireless communication system according to a second embodiment of the present technology.

FIG. 10 is a diagram showing a configuration example of a wireless communication system according to a second embodiment of the present technology.

A wireless communication system 101 in FIG. 10 is constituted by connecting a sensor terminal 11-1, a sensor terminal 11-2, and a communication device 12 of a base station by wireless communication. The sensor terminal 11-1 and the sensor terminal 11-2 exist at a short distance, for example.

Of the constitution shown in FIG. 10, the same constituents as those described with reference to FIG. 1 are designated by the same reference numerals. Redundant descriptions will be omitted as appropriate.

A DL frame, which is a frame by DL communication, is transmitted from the communication device 12 to the sensor terminal 11-1.

Moreover, a UL frame, which is a frame by UL communication, is transmitted from the sensor terminal 11-2 to the communication device 12 by using the same frequency as DL communication.

That is, in the wireless communication system 101 in FIG. 10, bidirectional communication is performed between the sensor terminal 11 and the communication device 12. For bidirectional communication, for example, a wireless communication method of a low power wide area (LPWA) is used.

Since the wireless communication system 101 is a wireless communication system for IoT, low power consumption and long distance transmission are important. The LPWA, which is a promising wireless communication method for IoT, can reduce the influence of thermal noise and interference and realize high reception sensitivity by lowering the data rate and narrowing the bandwidth of the frequency used. This makes it possible to realize long distance transmission even in a transmission line in which the attenuation due to PathLoss or the like is large and the strength of the reception signal is low.

Therefore, the strength of the reception signal of the DL frame in the sensor terminal 11-1 is a relatively low value.

Furthermore, since the wireless communication system 101 is a wireless communication system for IoT, there are many sensor terminals 11. It is assumed that a large number of sensor terminals 11 exist at a short distance, like the sensor terminals 11-1 and the sensor terminal 11-2.

Therefore, as shown in FIG. 10, in a case where there is a sensor terminal 11-2, which is transmitting a UL frame using the same frequency, near the sensor terminal 11-1, which is receiving a DL frame, the transmission signal of the UL frame causes a large interference with the reception signal of the DL frame, and it becomes difficult for the sensor terminal 11-1 to receive the DL frame.

Generally, UL frames and DL frames are transmitted using different wireless resources (frequency, time), but it is not realistic to pre-allocate different frequencies as in the first embodiment. Moreover, it must be assumed that time synchronization cannot be performed in the wireless communication system 101.

Therefore, in the wireless communication system 101, it is necessary to allow UL frames and DL frames to be transmitted using the same wireless resources.

Therefore, in the second embodiment, the chirp modulation of the DL frame is set to a down chirp instead of setting the chirp modulation of the control frame in the first embodiment to a down chirp. Moreover, instead of setting the chirp modulation of the data frame in the first embodiment to an up chirp, the chirp modulation of the UL frame is set to an up chirp.

Since the configuration of the sensor terminal 11 of the second embodiment is basically the same as the configuration of the sensor terminal 11 in FIG. 5, the description thereof will be omitted. Since the configuration of the communication device 12 of the second embodiment is basically the same as the configuration of the communication device 12 in FIG. 7, the description thereof will be omitted.

<Operation Example of Sensor Terminal>

Figure 11:
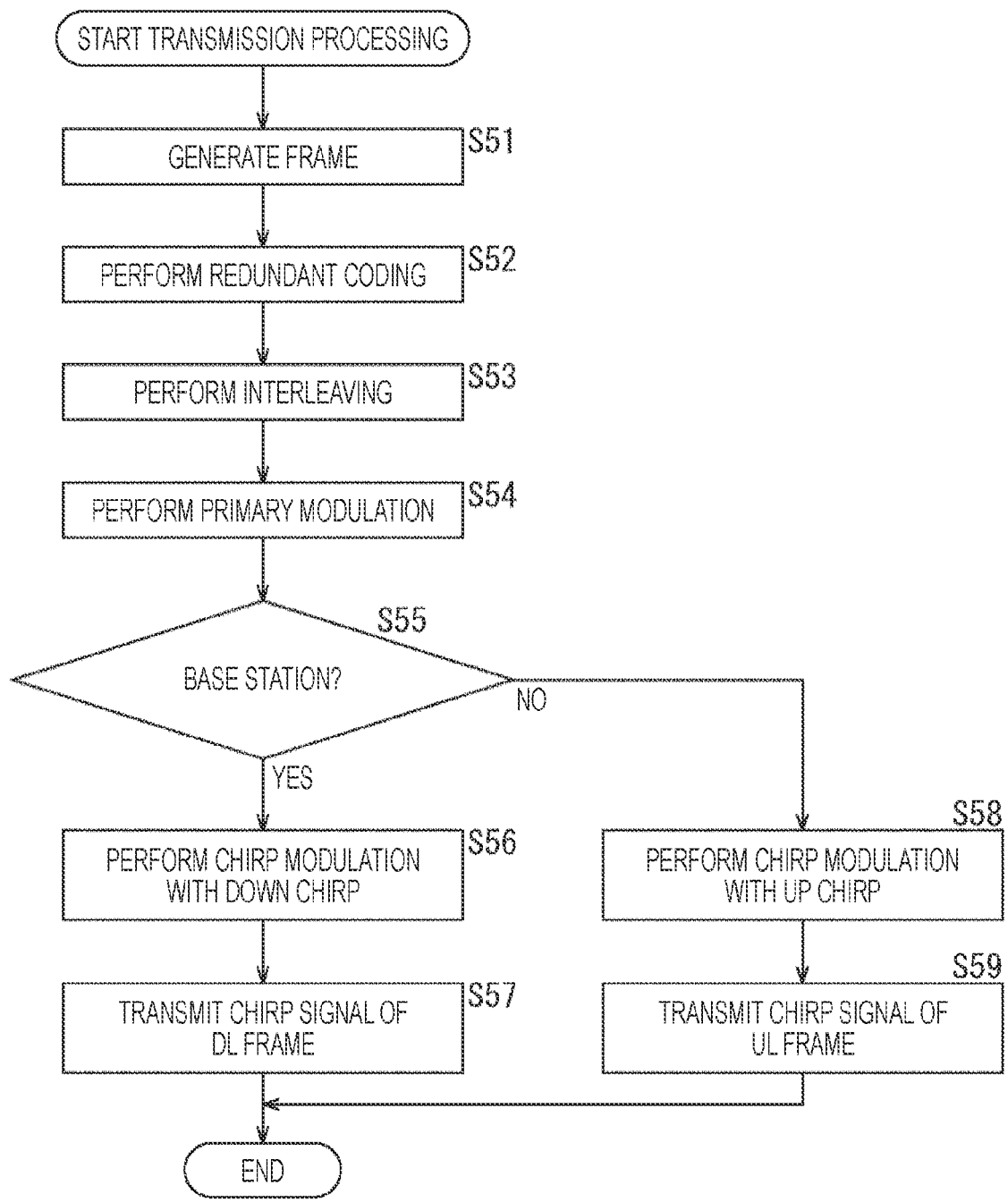
FIG. 11 is a flowchart illustrating transmission processing of a sensor terminal 11.

FIG. 11 is a flowchart illustrating transmission processing of the sensor terminal 11.

In FIG. 11, as one example, an example in which a data frame is transmitted as a UL frame from the sensor terminal 11 to the communication device 12 will be described.

In step S51, the control unit 32 generates a frame. A data frame including the sensor data is generated.

In step S52, the control unit 32 performs redundant coding on the generated frame to obtain the frame after the redundant coding.

In step S53, the control unit 32 interleaves the frame after the redundant coding to obtain the frame after the interleaving.

In step S54, the control unit 32 performs primary modulation on the frame after the interleaving to obtain the frame after the primary modulation.

In step S55, the control unit 32 determines whether or not it is a base station. For example, in a case where the transmission processing in FIG. 11 is performed by the control unit 52 of the communication device 12, it is determined in step S15 that the control unit 52 itself is a base station, and the processing proceeds to step S56.

In step S56, the control unit 52 obtains the chirp signal of the DL frame by chirp-modulating the data frame with a down chirp.

In step S57, the control unit 52 controls the wireless communication unit 51 to cause the chirp signal of the DL frame to be transmitted by using the transmission time and transmission frequency of the data frame.

On the other hand, since it is the control unit 32 of the sensor terminal 11 that performs the transmission processing in FIG. 11, it is determined in step S55 that the control unit 32 is not a base station, and the processing proceeds to step S58.

In step S58, the control unit 32 obtains a chirp signal of the UL frame by chirp-modulating the data frame with an up chirp.

In step S59, the control unit 32 controls the wireless communication unit 31 to cause the chirp signal of the UL frame to be transmitted by using the transmission time and transmission frequency of the data frame.

The transmission processing ends after the chirp signals of all DL frames have been transmitted in step S57 or after the chirp signals of all UL frames have been transmitted in step S59.

<Operation Example of Reception Device>

Figure 12:
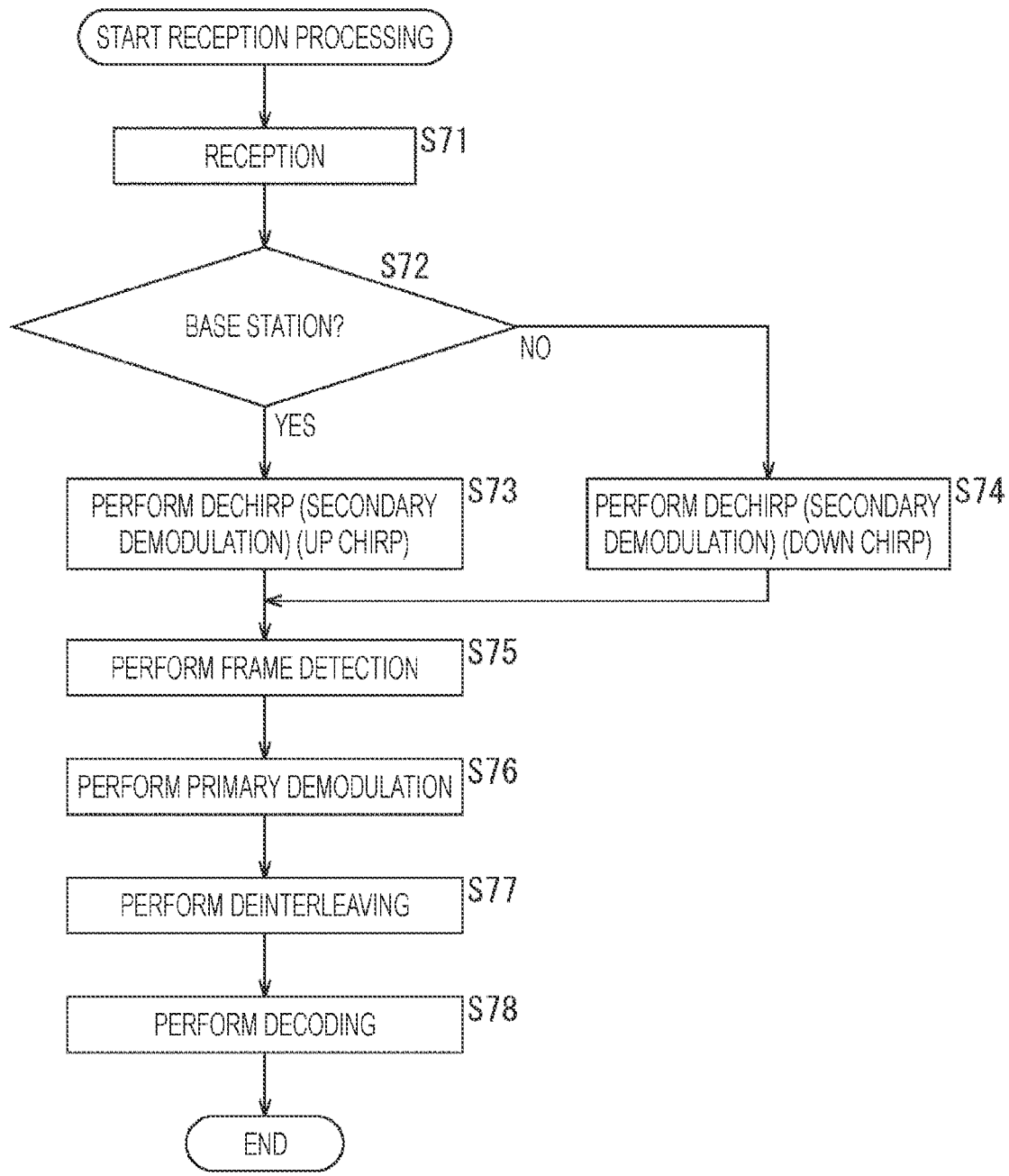
FIG. 12 is a flowchart illustrating reception processing of a communication device 12.

FIG. 12 is a flowchart illustrating reception processing of the communication device 12.

In FIG. 12, as one example, an example in which a data frame transmitted as a UL frame from the sensor terminal 11 is received by the communication device 12 will be described.

In step S71, the wireless communication unit 51 receives a wireless signal transmitted from the sensor terminal 11 and converts the wireless signal into a chirp signal. The wireless communication unit 51 outputs the converted chirp signal to the demodulation unit 53.

In step S72, the control unit 52 determines whether or not it is a base station.

In a case where it is determined in step S72 that it is a base station, the processing proceeds to step S73.

In step S73, the demodulation unit 53 dechirps (secondarily demodulates) the chirp signal supplied from the wireless communication unit 51 with an up chirp, obtains a demodulation signal, and supplies the obtained demodulation signal to the control unit 52.

Furthermore, for example, in a case where the reception processing of FIG. 12 is performed by the control unit 32 of the sensor terminal 11, it is determined in step S72 that the control unit 32 is not a base station, and the processing proceeds to step S74.

In step S74, the demodulation unit 33 dechirps (secondarily demodulates) the chirp signal supplied from the wireless communication unit 31 with a down chirp, obtains the demodulation signal, and supplies the obtained demodulation signal to the control unit 32.

In step S75, the control unit 32 detects the data frame from the demodulation signal supplied from the demodulation unit 33.

Note that, since FIG. 12 is the reception processing of the communication device 12, the description of the communication device 12 will be returned. In step S76 in FIG. 12, the control unit 52 of the communication device 12 primarily demodulates the detected data frame and obtains the data frame after the first demodulation.

In step S77, the control unit 52 performs deinterleaving and redundant decoding on the data frame after the primary demodulation and obtains the data frame after the redundant decoding.

In step S78, the control unit 52 decodes the data frame after the redundant decoding and acquires the sensor data included in the data frame obtained by the decoding. Thereafter, the reception processing ends.

<Example of Effects of Second Embodiment>

Figure 13:
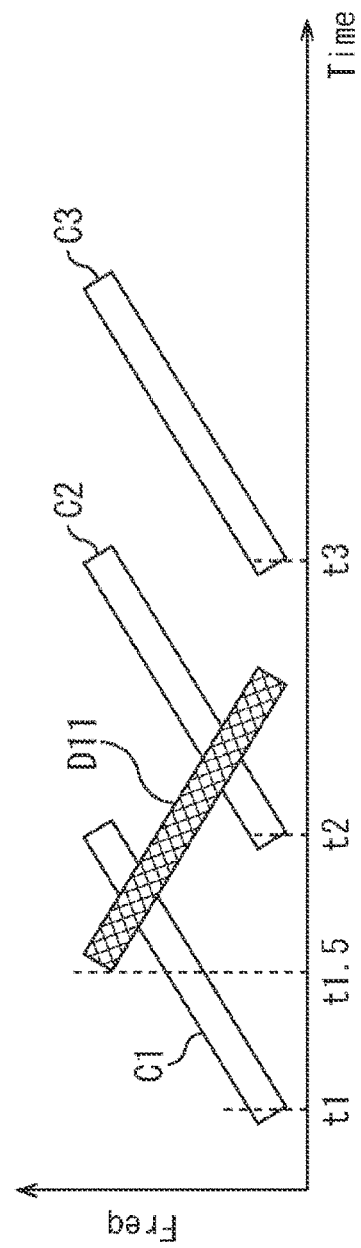
FIG. 13 is a diagram showing an example of transmitting chirp signals according to the second embodiment of the present technology.

FIG. 13 is a diagram showing an example of transmitting chirp signals according to the second embodiment of the present technology.

Chirp signals C1 to C3 in FIG. 13 are signals that change in frequency at the same rate with an up chirp. The chirp signals C1 to C3 are chirp signals of the UL frame transmitted from the sensor terminal 11-2.

As described above with FIG. 2, the transmission start times of the chirp signals C1 to C3 are the times t1 to t3, respectively.

On the other hand, a chirp signal D11 of the DL frame is signal that changes in frequency at the same rate as the chirp signals C1 to C3 of the UL frame with a down chirp. The chirp signal D11 is a chirp signal of the DL frame transmitted from the communication device 12 to the sensor terminal 11-1. Note that the transmission start time of the chirp signal D11 of the UL frame is time t1.5.

The interference between the chirp signals C1 to C3 of the UL frame and the chirp signal D11 of the DL frame occurs, as shown in FIG. 13, at only a frame portion included in a time signal at which the chirp signals C1 and C2 of the UL frame and the chirp signal D11 of the DL frame intersect.

Since only a part of the frame is affected by interference, error correction is possible by combining with redundant coding, interleaving and the like. Thus, it is possible to correctly demodulate both the chirp signal of the UL frame and the chirp signal of the DL frame on the reception side.

Note that, in the above, the frequency change of the chirp modulation of the UL frame is an up chirp, and the frequency change of the chirp modulation of the DL frame is a down chirp, but the increase/decrease directions may be opposite directions.

As described above, in the second embodiment, different directions are set as the increase/decrease directions of the frequency changes of the chirp modulation of the UL frame and the chirp modulation of the DL frame. Therefore, even in a case where the UL frame and the DL frame are transmitted using the same wireless resource, interference can be suppressed, and deterioration of reception performance can be prevented.

Third Embodiment

In a third embodiment, instead of setting the increase/decrease direction of the frequency change of the chirp modulation in each of the control frame and the data frame in the first embodiment, a chirp rate which is the speed of the frequency change of the chirp modulation is set.

Note that, when the chirp rate is lowered, the change in the transmission frequency that changes in the frame becomes small. Thus, in a case where the signal collides with a narrow band signal, the collision time becomes long, and the influence of the interference becomes large.

Therefore, in the third embodiment, a high chirp rate $\alpha$ is set for the control frame for which the data reception performance is desired to be high, and a low chirp rate $\beta$ ($\alpha > \beta$) is set for the data frame. Note that, in the case of the DL frame and the UL frame in the second embodiment, a high chirp rate $\alpha$ is set for the DL frame, and a low chirp rate $\beta$ ($\alpha > \beta$) is set for the UL frame.

Since the configuration of a sensor terminal 11 of the third embodiment is basically the same as the configuration of the sensor terminal 11 in FIG. 5, the description thereof will be omitted. Since the configuration of a communication device 12 of the third embodiment is basically the same as the configuration of the communication device 12 in FIG. 7, the description thereof will be omitted.

<Operation Example of Sensor Terminal>

Figure 14:
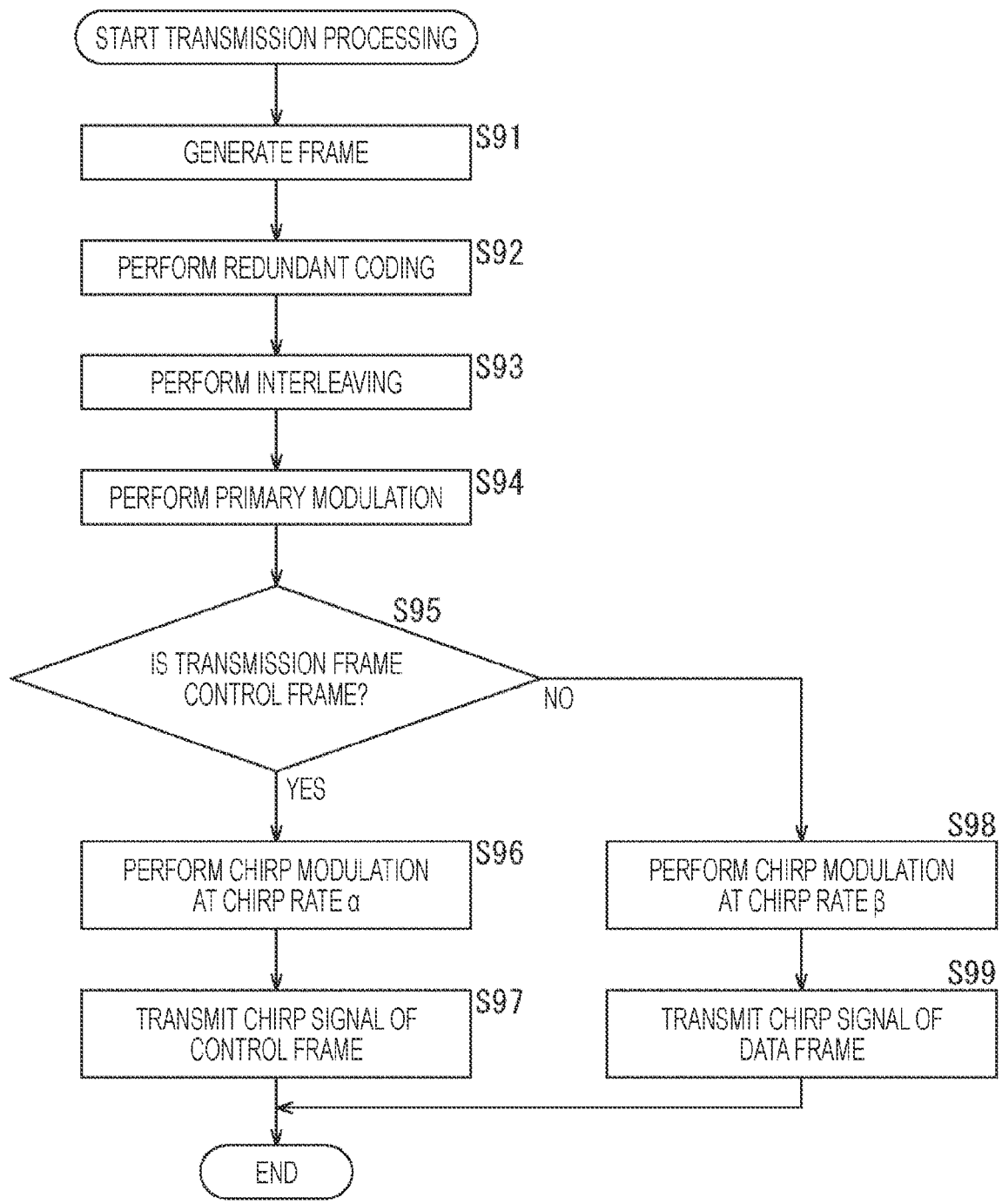
FIG. 14 is a flowchart illustrating transmission processing of the sensor terminal 11.

FIG. 14 is a flowchart illustrating transmission processing of the sensor terminal 11.

In step S91, a control unit 32 generates a frame. A control frame including the internal time and terminal ID of the sensor terminal 11 or a data frame including sensor data is generated.

In step S92, the control unit 32 performs redundant coding on the generated frame to obtain the frame after the redundant coding.

In step S93, the control unit 32 interleaves the frame after the redundant coding to obtain the frame after the interleaving.

In step S94, the control unit 32 performs primary modulation on the frame after the interleaving to obtain the frame after the primary modulation.

In step S95, the control unit 32 determines whether or not the frame to be transmitted is a control frame. In a case where it is determined in step S95 that the frame to be transmitted is a control frame, the processing proceeds to step S96.

In step S96, the control unit 32 obtains a chirp signal of the control frame by chirp-modulating the control frame at the chirp rate $\alpha$.

In step S97, the control unit 32 controls the wireless communication unit 31 to cause the chirp signal of the control frame to be transmitted by using the transmission time and transmission frequency of the control frame.

On the other hand, in a case where it is determined in step S95 that the frame to be transmitted is a data frame, the processing proceeds to step S98.

In step S98, the control unit 32 obtains the chirp signal of the data frame by chirp-modulating the data frame at the chirp rate β.

In step S99, the control unit 32 controls the wireless communication unit 31 to cause the chirp signal of the data frame, which is supplied from the control unit 32, to be transmitted by using the transmission time and transmission frequency of the data frame.

The transmission processing ends after the chirp signal of the control frame is transmitted in step S97 or after the chirp signal of the data frame is transmitted in step S99.

<Operation Example of Reception Device>

Figure 15:
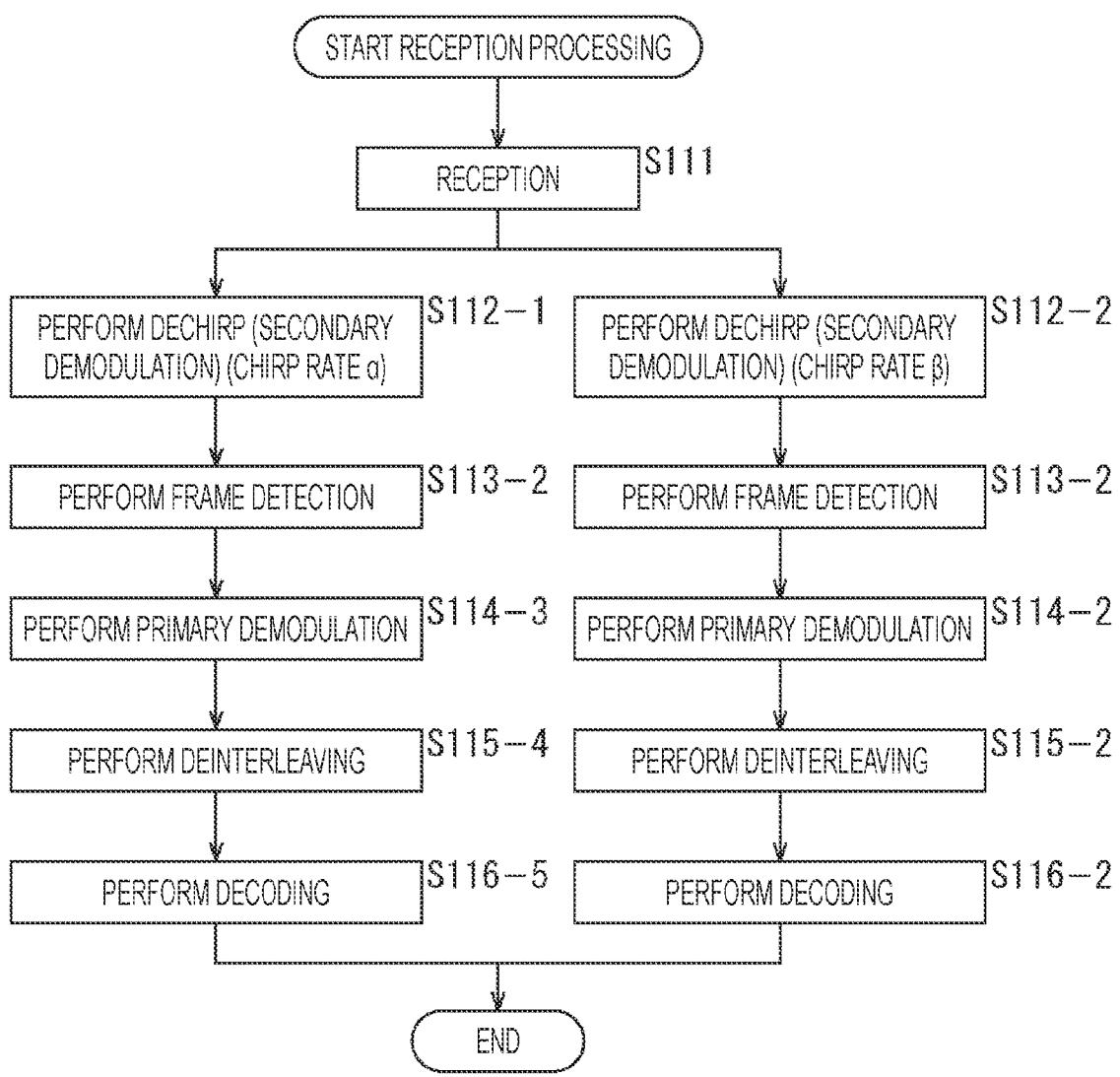
FIG. 15 is a flowchart illustrating reception processing of the communication device 12.

FIG. 15 is a flowchart illustrating reception processing of the communication device 12.

In step S111, the wireless communication unit 51 receives a wireless signal transmitted from the sensor terminal 11 and converts the wireless signal into a chirp signal. The wireless communication unit 51 outputs the converted chirp signal to the demodulation unit 53.

In the control unit 52 and the demodulation unit 53, for example, processing in a case where the chirp signal transmitted from the sensor terminal 11 is the chirp signal of the data frame (steps S112-1 to S116-1) and processing in a case where the chirp signal transmitted from the sensor terminal 11 is the chirp signal of the control frame (steps 112-2 to S116-2) are performed in parallel.

In step S112-1, the demodulation unit 53 dechirps (secondarily demodulates) the chirp signal supplied from the wireless communication unit 51 at the chirp rate α, obtains a demodulation signal, and supplies the obtained demodulation signal to the control unit 52.

In step S113-1, the control unit 52 detects the control frame from the demodulation signal supplied from the demodulation unit 53.

In step S114-1, the control unit 52 primarily demodulates the detected control frame and obtains the control frame after the primary demodulation.

In step S115-1, the control unit 52 performs deinterleaving and redundant decoding on the control frame after the primary demodulation and obtains the control frame after the redundant decoding.

In step S116-1, the control unit 52 decodes the control frame after the redundant decoding and acquires the internal time and the terminal ID of the sensor terminal 11 included in the control frame obtained by the decoding.

On the other hand, in step S112-2, the demodulation unit 53 dechirps (secondarily demodulates) the chirp signal supplied from the wireless communication unit 51 at the chirp rate β, obtains a demodulation signal, and supplies the obtained demodulation signal to the control unit 32.

In step S113-2, the control unit 52 detects a data frame from the demodulation signal supplied from the demodulation unit 53.

In step S114-2, the control unit 52 primarily demodulates the detected data frame and obtains the data frame after the primary demodulation.

In step S115-2, the control unit 52 performs deinterleaving and redundant decoding on the data frame after the primary demodulation and obtains the data frame after the redundant decoding.

In step S116-2, the control unit 52 decodes the data frame after the redundant decoding and obtains the sensor data included in the data frame obtained by the decoding. Thereafter, the reception processing ends.

<Example of Effects of Third Embodiment>

Figure 16:
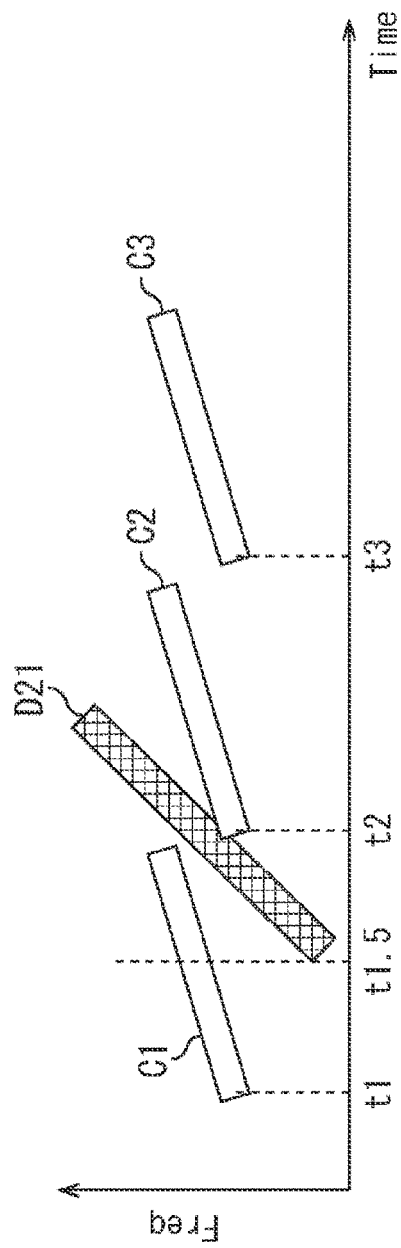
FIG. 16 is a diagram showing an example of transmitting chirp signals according to a third embodiment of the present technology.

FIG. 16 is a diagram showing an example of transmitting chirp signals according to the third embodiment of the present technology.

Chirp signals C1 to C3 in FIG. 16 are signals that change in frequency at the chirp rate β with an up chirp. The chirp signals C1 to C3 are chirp signals of the data frame transmitted from the sensor terminal 11-1.

As described above with FIG. 2, the transmission start times of the chirp signals C1 to C3 are the times t1 to t3, respectively.

On the other hand, a chirp signal D21 is a signal that changes in frequency at a chirp rate α (α>β) different from the chirp signals C1 to C3 of the data frame with an up chirp. The chirp signal D21 is a chirp signal of the control frame transmitted from another sensor terminal 11-2. Note that the transmission start time of the chirp signal D21 of the control frame is time t1.5.

The interference between the chirp signals C1 to C3 of the data frame and the chirp signal D21 of the control frame occurs at only a frame portion of a time at which the chirp signals C1 and C2 of the data frame and the chirp signal D21 of the control frame intersect.

Since only a part of the signal is affected by interference, error correction is possible by combining with redundant coding, interleaving, and the like. Thus, it is possible to correctly demodulate both the chirp signal of the control frame and the chirp signal of the data frame on the reception side.

Note that, in the above, the frequency change of the chirp modulation of the control frame and the data frame is set to an up chirp, but the effects of the increase/decrease direction are the same even if the frequency change of the chirp modulation of the control frame and the data frame is set to a down chirp.

As described above, in the third embodiment, different rates are set for chirp rates of each of the frequency changes of the chirp modulation of the control frame and the chirp modulation of the data frame. Therefore, even in a case where the control frame and the data frame are transmitted using the same wireless resource, interference can be suppressed, and deterioration of reception performance can be prevented.

The technology of the first embodiment, the technology of the second embodiment, and the technology of the third embodiment described above can be used in combination.

As described above, according to the present technology, different methods of changing the frequency of the chirp modulation are set for each of the types and the transmission directions of the frames to be transmitted.

This makes it possible to provide a wireless communication system that suppresses interference and suppresses deterioration of reception performance even in a case where a control frame and a data frame are transmitted using the same wireless resource.

Note that, in the above description, the terminal is shown as a sensor terminal, but the present technology can also be applied to a terminal without a sensor.

Fourth Embodiment

<Configuration Example of Computer>

The series of processings described above can be executed by hardware or can be executed by software. In a case where the series of processings is executed by software, a program constituting the software is installed in a computer incorporated into dedicated hardware, a general-purpose personal computer, or the like from a program-recorded medium.

Figure 17:
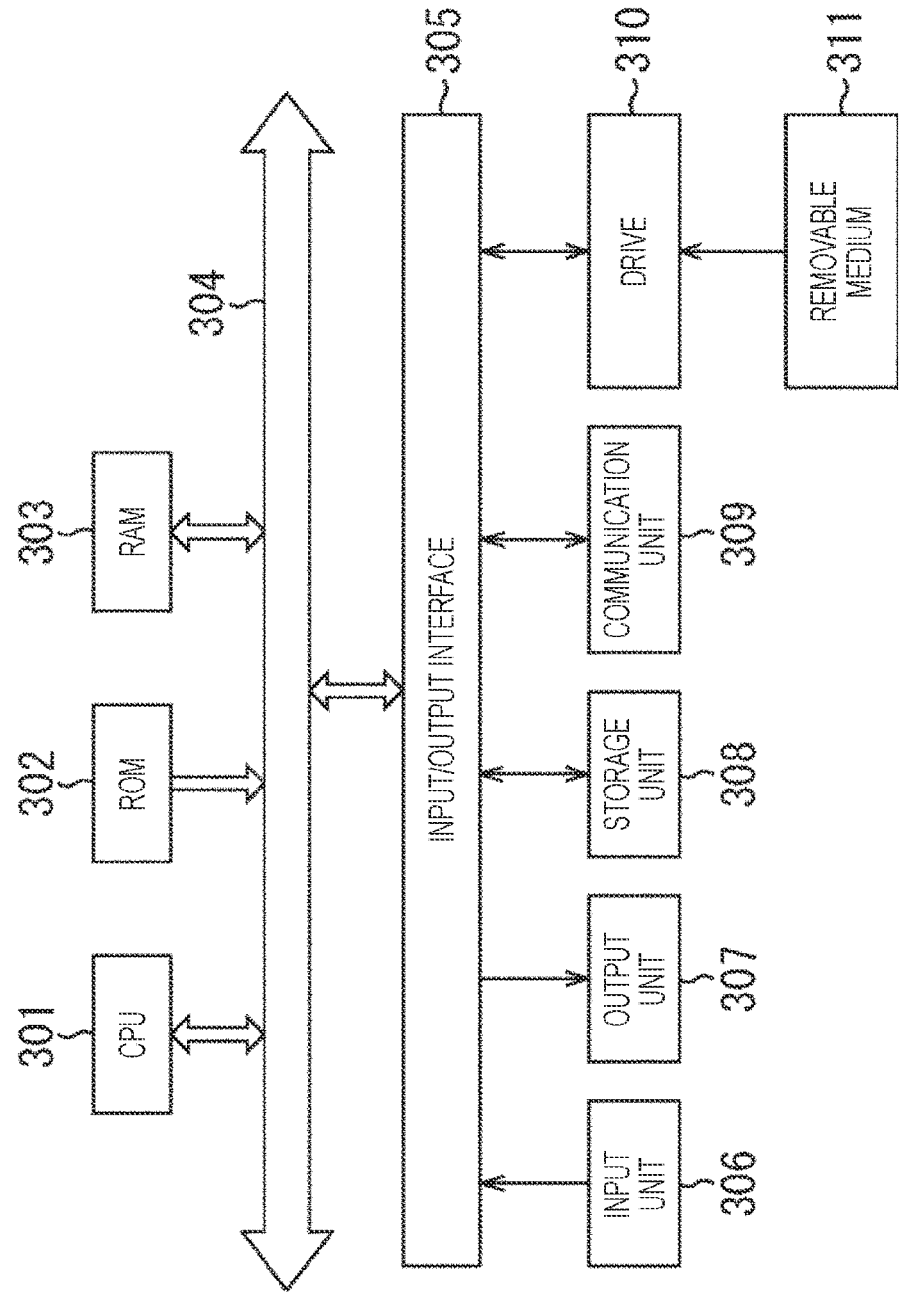
FIG. 17 is a block diagram showing a configuration example of a computer.

FIG. 17 is a block diagram showing a configuration example of hardware of a computer which executes the aforementioned series of processings by a program.

A central processing unit (CPU) 301, a read only memory (ROM) 302, and a random access memory (RAM) 303 are connected to each other by a bus 304.

The bus 304 is further connected to an input/output interface 305. The input/output interface 305 is connected to an input unit 306 constituted by a keyboard, a mouse, and the like, and an output unit 307 constituted by a display, a speaker, and the like. Furthermore, the input/output interface 305 is connected to a storage unit 308 constituted by a hard disk, a non-volatile memory, or the like, a communication unit 309 constituted by a network interface or the like, and a drive 310 for driving a removable medium 311.

In the computer configured as described above, the CPU 301 loads, for example, a program stored in the storage unit 308 into the RAM 303 via the input/output interface 305 and the bus 304 and executes the program, thereby performing the above-described series of processings.

The program executed by the CPU 301 is, for example, recorded on the removable medium 311 or provided via a wired or wireless transmission medium such as a local area network, the Internet, or a digital broadcast, and installed in the storage unit 308.

Note that the program executed by the computer may be a program in which the processings are performed in time series according to the order described in the specification, or may be a program in which the processings are performed in parallel or at necessary timings such as when a call is made.

Note that, in the specification, the system means a group of a plurality of constituent elements (devices, modules (parts), and the like), and it does not matter whether or not all the constituent elements are in the same housing. Therefore, a plurality of devices, which is housed in separate housings and connected via a network, and one device, in which a plurality of modules is housed in one housing, are both systems.

Note that the effects described in the specification are merely examples and are not limited, and other effects may be exerted.

Note that the embodiments of the present technology are not limited to the above embodiments, and various changes can be made in a scope without departing from the gist of the present technology.

For example, the present technology can adopt a configuration of cloud computing in which one function is shared and collaboratively processed by a plurality of devices via a network.

Furthermore, each step described in the above-described flowcharts can be executed by one device or can also be shared and executed by a plurality of devices.

Moreover, in a case where a plurality of processings is included in one step, the plurality of processings included in the one step can be executed by one device or can also be shared and executed by a plurality of devices.

The present technology can also adopt the following configurations.

(1) A transmission device including:
a control unit that sets a different frequency change of chirp modulation for each of first information and second information different from the first information; and
a transmission unit that transmits the first information or the second information that has undergone the chirp modulation in accordance with the set frequency change.

(2) The transmission device according to (1), in which
the control unit sets a different increase/decrease direction of the frequency change in each of the first information and the second information.

(3) The transmission device according to (2), in which
the control unit
sets the increase/decrease direction of the frequency change of the first information to a down chirp and
sets the increase/decrease direction of the frequency change of the second information to an up chirp.

(4) The transmission device according (2) or (3), in which
the first information is a control frame, and the second information is a data frame.

(5) The transmission device according (2) or (3), in which
the first information is a DL frame, and the second information is a UL frame.

(6) The transmission device according to any one of (1) to (3), in which
the control unit sets a different rate of the frequency change for each of the first information and the second information.

(7) The transmission device according to (6), in which
the control unit
sets a rate of the frequency change of the first information to α and
sets a rate of the frequency change of the second information to β (α>β).

(8) The transmission device according (6) or (7), in which
the first information is a control frame, and the second information is a data frame.

(9) The transmission device according (6) or (7), in which
the first information is a DL frame, and the second information is a UL frame.

(10) A transmission method, in which
a transmission device
sets a different frequency change of chirp modulation for each of first information and second information different from the first information and
transmits the first information or the second information that has undergone the chirp modulation in accordance with the set frequency change.

(11) A reception device including:
a reception unit that receives first information or second information that has undergone chirp modulation in accordance with a different frequency change of the chirp modulation set for each of the first information and the second information different from the first information; and
a demodulation unit that demodulates the received first information or second information in accordance with the frequency change set for each of the first information and the second information.

(12) The reception device according to (11), in which
the demodulation unit demodulates the received first information or second information according to an increase/decrease direction of the different frequency change set for each of the first information and the second information.

(13) The reception device according to (12), in which
the increase/decrease direction of the frequency change of the first information is set to a down chirp, and the increase/decrease direction of the frequency change of the second information is set to an up chirp.
(14) The reception device according (12) or (13), in which
the first information is a control frame, and the second information is a data frame.
(15) The reception device according (12) or (13), in which
the first information is a DL frame, and the second information is a UL frame.
(16) The reception device according to any one of (11) to (13), in which
the demodulation unit demodulates the received first information or second information in accordance with a different rate of the frequency change set for each of the first information and the second information.
(17) The reception device according to (16), in which
a rate of the frequency change of the first information is set to α, and a rate of the frequency change of the second information is set to β (α>β).
(18) The reception device according (16) or (17), in which
the first information is a control frame, and the second information is a data frame.
(19) The reception device according (16) or (17), in which
the first information is a DL frame, and the second information is a UL frame.
(20) A reception method, in which
a reception device
receives first information or second information that has undergone chirp modulation in accordance with a different frequency change of the chirp modulation set for each of the first information and the second information different from the first information and
demodulates the received first information or second information in accordance with the frequency change set for each of the first information and the second information.

REFERENCE SIGNS LIST

1 Wireless communication system
11, 11-1 to 11-N Sensor terminal
12 Communication device
31 Wireless communication unit
32 Control unit
33 Demodulation unit
51 Wireless communication unit
52 Control unit
53 Demodulation unit
101 Wireless communication system

The invention claimed is:
1. A transmission device, comprising:
a control unit configured to:
   determine whether a frame to be transmitted corresponds to first information or second information;
   set a first frequency change of chirp modulation for a chirp signal of the frame based on the determination that the frame corresponds to the first information; and
   set a second frequency change of the chirp modulation for the chirp signal of the frame based on the determination that the frame corresponds to the second information different from the first information, wherein the second frequency change is different from the first frequency change; and
a transmission unit configured to transmit the first information and the second information that have undergone the chirp modulation.
2. The transmission device according to claim 1, wherein the control unit is further configured to set a different increase/decrease direction of a frequency change of the chirp modulation in each of the first information and the second information.
3. The transmission device according to claim 2, wherein the control unit is further configured to:
   set an increase/decrease direction of the frequency change of the first information to a down chirp; and
   set the increase/decrease direction of the frequency change of the second information to an up chirp.
4. The transmission device according to claim 3, wherein
the first information includes a control frame, and
the second information includes a data frame.
5. The transmission device according to claim 3, wherein
the first information includes a downlink (DL) frame, and
the second information includes an uplink (UL) frame.
6. The transmission device according to claim 1, wherein the control unit is further configured to set a different rate of a frequency change of the chirp modulation for each of the first information and the second information.
7. The transmission device according to claim 6, wherein the control unit is further configured to:
   set a rate of the frequency change of the first information to α; and
   set a rate of the frequency change of the second information to β (α>β).
8. The transmission device according to claim 7, wherein
the first information includes a control frame, and
the second information includes a data frame.
9. The transmission device according to claim 7, wherein
the first information includes a DL frame, and
the second information includes a UL frame.
10. A transmission method, comprising:
in a transmission device:
   determining whether a frame to be transmitted corresponds to first information or second information;
   setting a first frequency change of chirp modulation for a chirp signal of the frame based on the determination that the frame corresponds to the first information;
   setting a second frequency change of the chirp modulation for the chirp signal of the frame based on the determination that the frame corresponds to the second information different from the first information, wherein the second frequency change is different from the first frequency change; and
   transmitting the first information and the second information that have undergone the chirp modulation.
11. A reception device, comprising:
a reception unit configured to receive first information and second information that has undergone chirp modulation in accordance with a different frequency change of the chirp modulation set for each of a chirp signal of the first information and a chirp signal of the second information different from the first information; and
a demodulation unit configured to:
   demodulate the first information in accordance with a first frequency change; and
   demodulate the second information in accordance with a second frequency change different from the first frequency change.
12. The reception device according to claim 11, wherein the demodulation unit is further configured to demodulate one of the first information or the second information according to an increase/decrease direction of the different frequency change set for each of the first information and the second information.

13. The reception device according to claim 12, wherein
the increase/decrease direction of a frequency change of the first information is set to a down chirp, and
the increase/decrease direction of the frequency change of the second information is set to an up chirp.

14. The reception device according to claim 13, wherein
the first information includes a control frame, and
the second information includes a data frame.

15. The reception device according to claim 13, wherein
the first information includes a DL frame, and
the second information includes a UL frame.

16. The reception device according to claim 11, wherein the demodulation unit is further configured to demodulate one of the first information or the second information in accordance with a different rate of a frequency change of the chirp modulation set for each of the first information and the second information.

17. The reception device according to claim 16, wherein
a rate of the frequency change of the first information is set to $\alpha$, and
a rate of the frequency change of the second information is set to $\beta$ ($\alpha>\beta$).

18. The reception device according to claim 17, wherein
the first information includes a control frame, and
the second information includes a data frame.

19. The reception device according to claim 17, wherein
the first information includes a DL frame, and
the second information includes a UL frame.

20. A reception method, comprising:
in a reception device:
receiving first information and second information that has undergone chirp modulation in accordance with a different frequency change of the chirp modulation set for each of a chirp signal of the first information and a chirp signal of the second information different from the first information;
demodulating the first information in accordance with a first frequency change; and
demodulating the second information in accordance with a second frequency change different from the first frequency change.

* * * * *